United States Patent [19]
Scott

[11] Patent Number: 5,927,607
[45] Date of Patent: Jul. 27, 1999

[54] SPRINKLE WITH VELOCITY CONTROL DISC

[75] Inventor: Loren W. Scott, Carlsbad, Calif.

[73] Assignee: Hunter Industries Incorporated, San Marcos, Calif.

[21] Appl. No.: 09/031,111

[22] Filed: Feb. 26, 1998

[51] Int. Cl.[6] .............................. B05B 15/10; B05B 3/00
[52] U.S. Cl. .................... 239/205; 239/206; 239/570; 137/514.5; 137/516.27
[58] Field of Search ..................... 239/201, 200, 239/203, 204, 205, 206, 570; 251/48, 50; 137/514.5, 516.27

[56] References Cited

U.S. PATENT DOCUMENTS

| | | | |
|---|---|---|---|
| 2,909,325 | 10/1959 | Hunter | 239/205 |
| 3,029,834 | 4/1962 | Vanden-hoek | 137/514.5 |
| 4,874,066 | 10/1989 | Silberstein | 188/280 |
| 5,638,860 | 6/1997 | DeRoche | 137/493.8 |
| 5,735,768 | 4/1998 | Clark | 239/205 |

*Primary Examiner*—Andres Kashnikow
*Assistant Examiner*—Jorge Bocanegra
*Attorney, Agent, or Firm*—Michael H. Jester

[57] ABSTRACT

A pop up sprinkler unit includes a housing having an inlet including a passage for connecting to a source of fluid such as water or air, a pressure responsive inlet valve assembly including a valve seat surrounding the inlet, a valve member having annular sealing normally biased into engagement with the seat, and a velocity control disc mounted on the valve member and extending into the passage at the inlet, the velocity control disc metering initial inlet fluid for controlling the rate of opening of the valve for controlling flow of fluid through the valve to a nozzle and extension of a riser to an extended position.

20 Claims, 4 Drawing Sheets

SPRINKLE WITH VELOCITY CONTROL DISC

BACKGROUND OF THE INVENTION

The present invention relates to irrigation sprinklers and pertains particularly to an improved water velocity control disc for an inlet flow check valve assembly of a pop-up sprinkler unit.

The use of irrigation systems for watering plants where rainfall is inadequate is in wide use throughout the world today. One of the most widely used systems, particularly for lawn areas and playing or athletic fields, is the sprinkler system wherein a plurality of pop-up sprinkler units are positioned about a land area for distributing water over the surface of the land area. These units have a riser which retracts into a fixed subsurface housing when not in use. When water is supplied to the unit, the riser extends or pops-up from the underground housing into a position to distribute water.

Sprinkler units of this type are widely used on golf courses and other turf applications. These are usually high pressure systems and are frequently subjected to significant forces each time water is supplied to them, particularly when they are subjected to high pressure air or water. These high forces over a lifetime of use can damage sprinkler units and reduce their useful life. The highest forces result when a sprinkler unit is subjected to surge conditions, such as when the system is being winterized or being refilled with water in the spring. In climates where irrigation systems are subject to freezing, the water must be removed from the system before winter. The water is purged from the system by means of compressed air. The compressed air acts much more rapidly than water and usually results in the risers shooting up rapidly with very high forces resulting in damage to the sprinkler units.

These high forces also frequently occur when empty pipes are being filled with water. As the lines are being filled, air or a combination of water and air is forced into each sprinkler unit and vented through the same. Under these conditions the riser frequently shoots up at a high velocity and is slammed against the stationary housing with relatively great force.

Attempts to solve this problem by making the sprinkler units heavier and stronger have been unsatisfactory because of increased costs. The dual medium of water and air makes unsatisfactory the use of slow opening valves to control the out-flow.

Another problem frequently encountered in sprinkler units is that large particles get trapped between the valve and seat during closing of the valve. This results in continuous leakage until the sprinkler unit is cycled again.

Therefore, there is a need for means for reducing the extension velocity of the riser in order to prolong the life of pop-up sprinkler units. There is also a need for a sprinkler unit design that reduces the tendency for large particles to become trapped on the valve seat.

Accordingly, it would be desirable that a sprinkler unit be available having means for reducing the riser extension velocity to prevent the resultant high forces and consequential damage. It would also be desirable that a sprinkler unit have some means for reducing the tendency for large particles to become trapped on the valve seat.

SUMMARY AND OBJECTS OF THE INVENTION

Accordingly, it is a primary object of the present invention to provide a pop-up sprinkler unit having an improved inlet valve assembly for controlling riser extension velocities and reducing high forces normally resulting therefrom.

In accordance with the primary aspect of the present invention, a pop up sprinkler unit comprises a housing having an inlet including a passage for connecting to a source of pressurized fluid, a pressure responsive inlet valve assembly including a valve seat surrounding said inlet, a valve member having annular sealing means biased into engagement with said seat, and damping means mounted on said valve member and extending into said passage at said inlet, said damping means metering initial inlet fluid for controlling the rate of opening of said valve for controlling the extension velocity of the riser.

BRIEF DESCRIPTION OF THE DRAWINGS

The above and other objects and advantages of the present invention will become apparent from the following description when read in conjunction with the drawings wherein.

Throughout the drawing figures, like reference numerals refer to like parts.

DETAILED DESCRIPTION OF THE PREFERRED EMBODIMENTS

Figure 1:
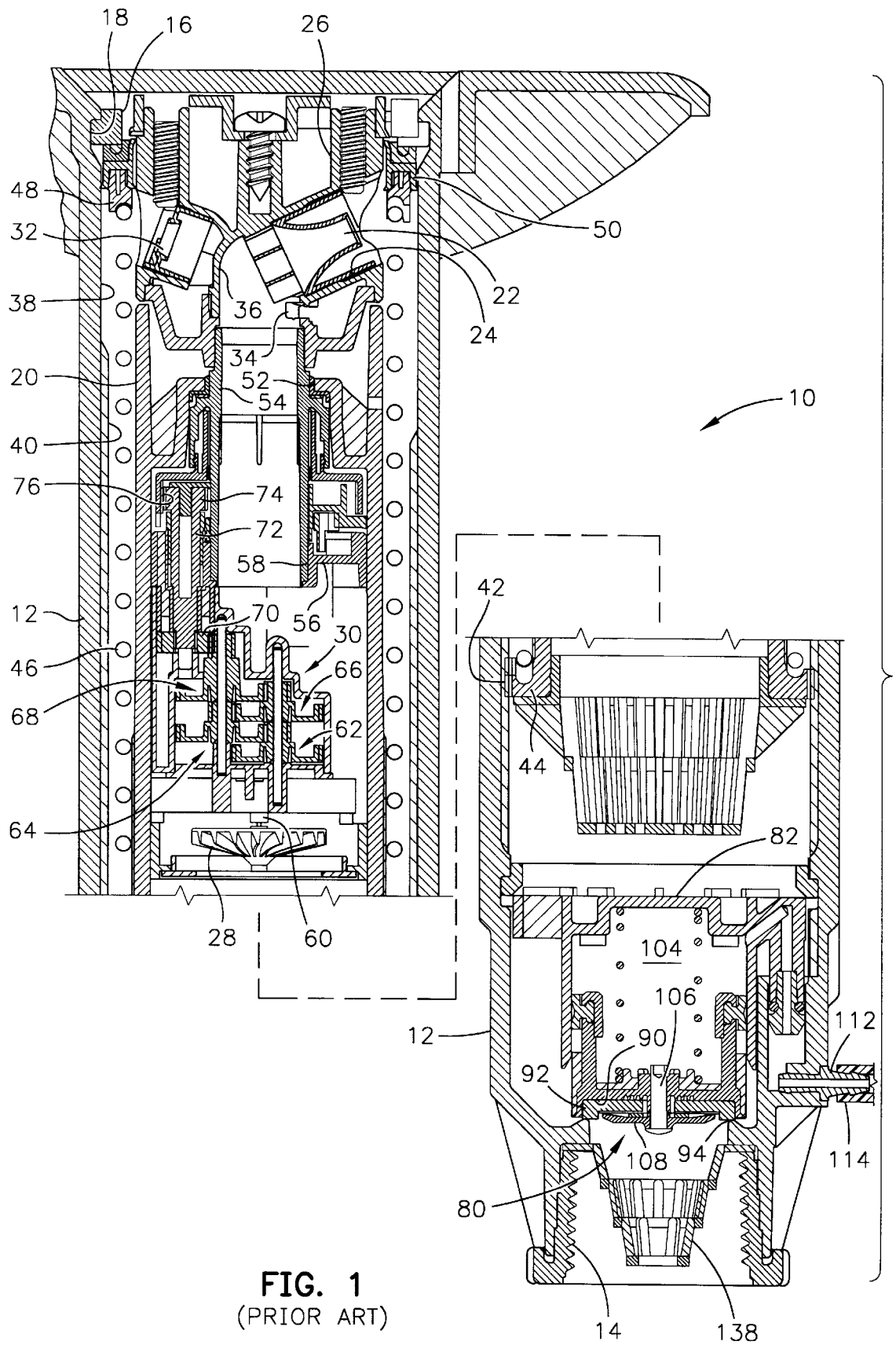
FIG. 1 is a vertical sectional view of a prior art pop-up sprinkler unit incorporating a conventional inlet flow check valve assembly.

Referring to FIG. 1, there is illustrated a conventional pop-up sprinkler unit 10. It includes a generally cylindrical tubular outer housing 12, having a threaded inlet opening 14 at a lower end for mounting to the end of a fixed riser or the like (not illustrated) connected to a source of pressurized fluid which may be water, air, or a combination of water and air. An upper outlet end of the housing 12 is provided with a retaining ring 16 detachably mounted in an annular recess 18 for securing a retractably mounted cylindrical tubular inner housing or riser 20.

The riser 20 (FIG. 1) is retractably mounted inside the outer housing 12 for extension upward therefrom. The riser 20 includes a nozzle 22 mounted in an upper or outer end thereof for distributing a stream of water therefrom. The nozzle 22 is mounted in a passage or socket 24 in a head 26 that is rotatably driven by means of a turbine 28 through a reduction gear drive train 30, as more fully described hereafter.

The particular sprinkler unit 10 (FIG. 1) is designed for golf course and playing field use. The nozzle 22 rotates in a partial or full circle about a central vertical axis of the outer housing 12. A second nozzle 32 is mounted in the head 26 opposite the nozzle 22. The nozzle 32 communicates via a port 34 with a through passage 36 to improve the distribution of the stream of water closer in to the sprinkler unit 10.

The riser 20 (FIG. 1) is retractably mounted within a bore 38 of the outer housing 12, and is oriented by a plurality of circumferentially spaced internal ribs 40 and by means of teeth 42 on a radial flange 44 at the lower end thereof. An elongated coil-type compression spring 46 engages a shoulder or flange 44 at the lower end of the riser 20, and is confined within the bore by means of the retaining ring 16 at the upper end. The riser 20 is normally biased by the spring 46 to its lowermost or retracted position, as illustrated in FIG. 1, when the water pressure is shut off. The spring 46 is positioned between the annular flange 44 and a ring 48 at the upper end of the housing 12, which biases against an outer annular seal assembly 50 retained in position by the retaining ring 16.

The riser 20 (FIG. 1) carries the rotating head 26 from its retracted position in the outer housing 12 to an extended position above the ground surface where the head 26 rotates and distributes water. The riser 20 converges at the top with inwardly tapering walls to an opening 52 in which is rotatably mounted a tubular shaft 54, having an upper end extending above the upper end of housing 20 and upon which the rotating head 26 is mounted. The shaft 54 serves to mount the head 26 to convey water from the inlet opening 14 to the outlet nozzles 22 and 32. The shaft 54 also transfers torque from the gear drive train 30 to the rotating head 26.

The driving assembly for rotating the head 26 is mounted in the riser 20 and includes support structure 56 having a journal 58 in which the lower end of the tubular shaft 54 is rotatably mounted. A shoulder surrounds the opening 52 and is engaged by a shoulder on rotary shaft 54.

The turbine 28 rotates in response to water flowing upwardly through the sprinkler unit 10. The turbine 28 is mounted on a shaft 60 which drivingly rotates a pinion gear which meshes with and drives a reduction gear unit 62 having a larger driven gear and a smaller pinion gear. The reduction gear unit 62 further drives a reduction gear unit 64 which in turn drives a reduction gear unit 66 further driving a reduction gear 68. The reduction gear 68 is the final drive component in the reduction drive gear train 30. The gear 68 meshes with a gear 70 on a shaft 72 for driving a pinion 74 which in turn drives an internal ring gear 76 which drives the tubular shaft 54.

An inlet flow check valve assembly 80 (FIG. 1) is mounted adjacent the inlet opening 14 of the outer housing 12 and controls fluid entering the sprinkler unit 10. The check valve assembly 80 also prevents back flow. The check valve assembly 80 comprises a housing 82 (FIG. 2) which may or may not be integral with the outer housing 12. The housing 82 is shown as a separate insert in FIG. 2. The housing 82 is of a generally cylindrical configuration and is positioned coaxially within the bore of housing 12 adjacent the inlet 14. The housing 82 includes an outer cylindrical wall 84 having an internal bore 86 in which a generally cylindrical valve member 88 is reciprocally mounted.

Figure 2:
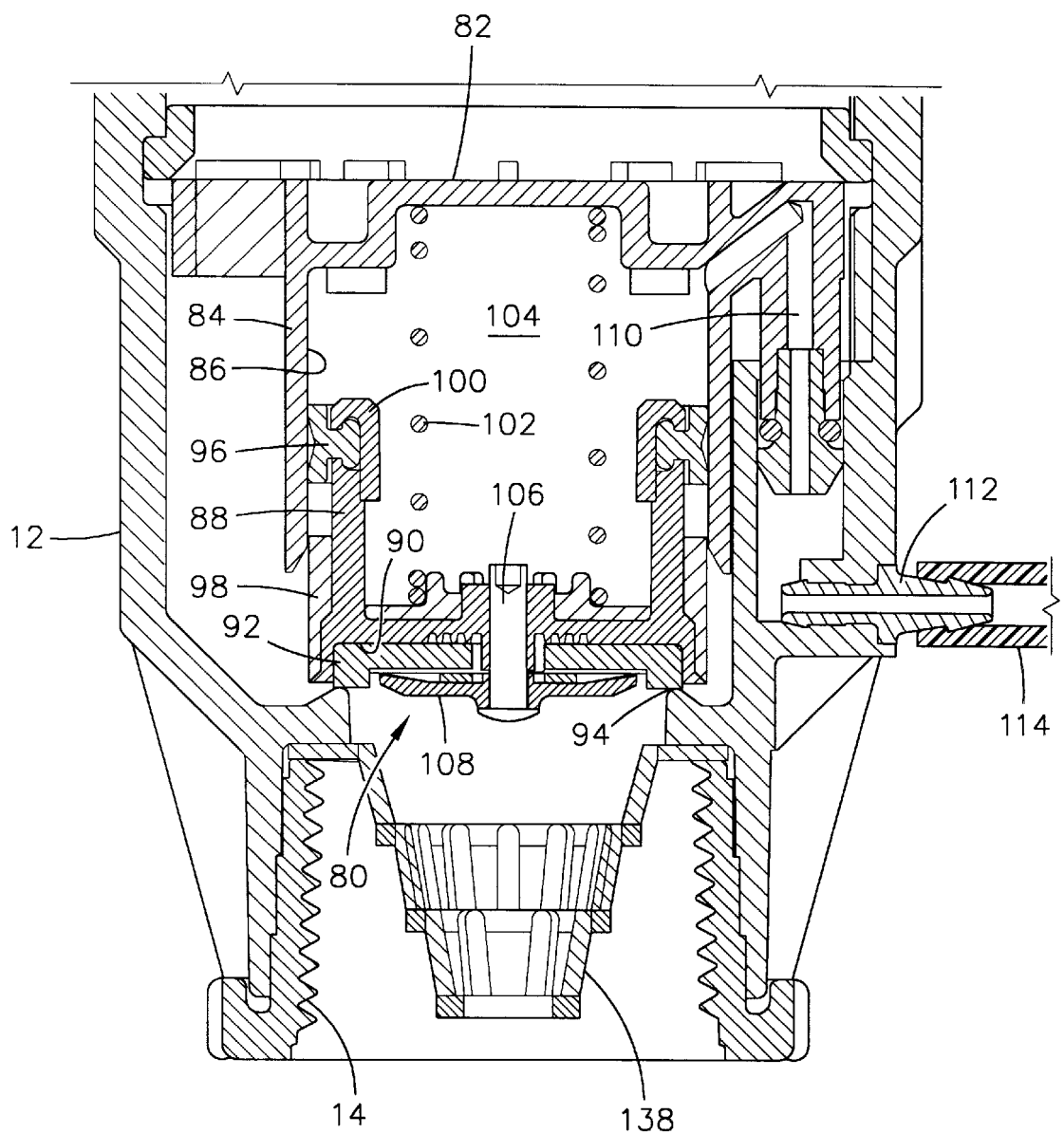
FIG. 2 is an enlarged vertical sectional view showing further details of the inlet flow check valve assembly illustrated in FIG. 1.

The valve member 88 (FIG. 2) has a generally cylindrical configuration including a circular face 90 (FIG. 1) on which is mounted an elastomeric valve seal 92 (FIG. 2) for sealingly engaging an annular valve seat 94 surrounding the inlet opening 14. The valve member 88 is reciprocally mounted in the bore 86 by means of an annular seal 96 and guided by a plurality of ribs 98. An annular retainer ring 100 threadably mounts to the interior of the valve seal 92 and retains the seal 96 in place. A coil-type spring 102 normally biases the valve member 88 to its closed or seated position as shown in FIGS. 1 and 2.

The valve member 88 (FIG. 2) closes the bore 86 forming a closed chamber 104 which is normally pressurized to maintain the valve member 88 in its closed or seated position. A rivet 106 engages a retaining and strainer washer disc 108 which engages and retains the valve seal 92 on the face of the valve member 88. Pressurized fluid from the inlet 14 flows very slowly past slots in the edge of disc 108 via a tortuous passage through the face 90 of valve member 88 into chamber 104 and maintains the valve member 88 in its normally closed position. Further details of this construction are described in pending U.S. patent application Ser. No. 08/752,444, filed Nov. 14, 1996, of Bradley M. Lousberg, entitled, "Irrigation Control Valve and Screen", the entire disclosure of which is specifically incorporated herein by reference.

The chamber 104 is vented via a passage 110 (FIG. 2) in the valve housing 82 and an outlet 112 in the sprinkler outer housing 12 by a remotely controlled solenoid valve (not shown). This venting enables inlet fluid to open the valve member 88. When the incoming fluid is air or a mixture of air and water, the valve member 88 may open rapidly causing a very rapid extension of the riser 20, which may damage the sprinkler unit 10.

Figure 3:
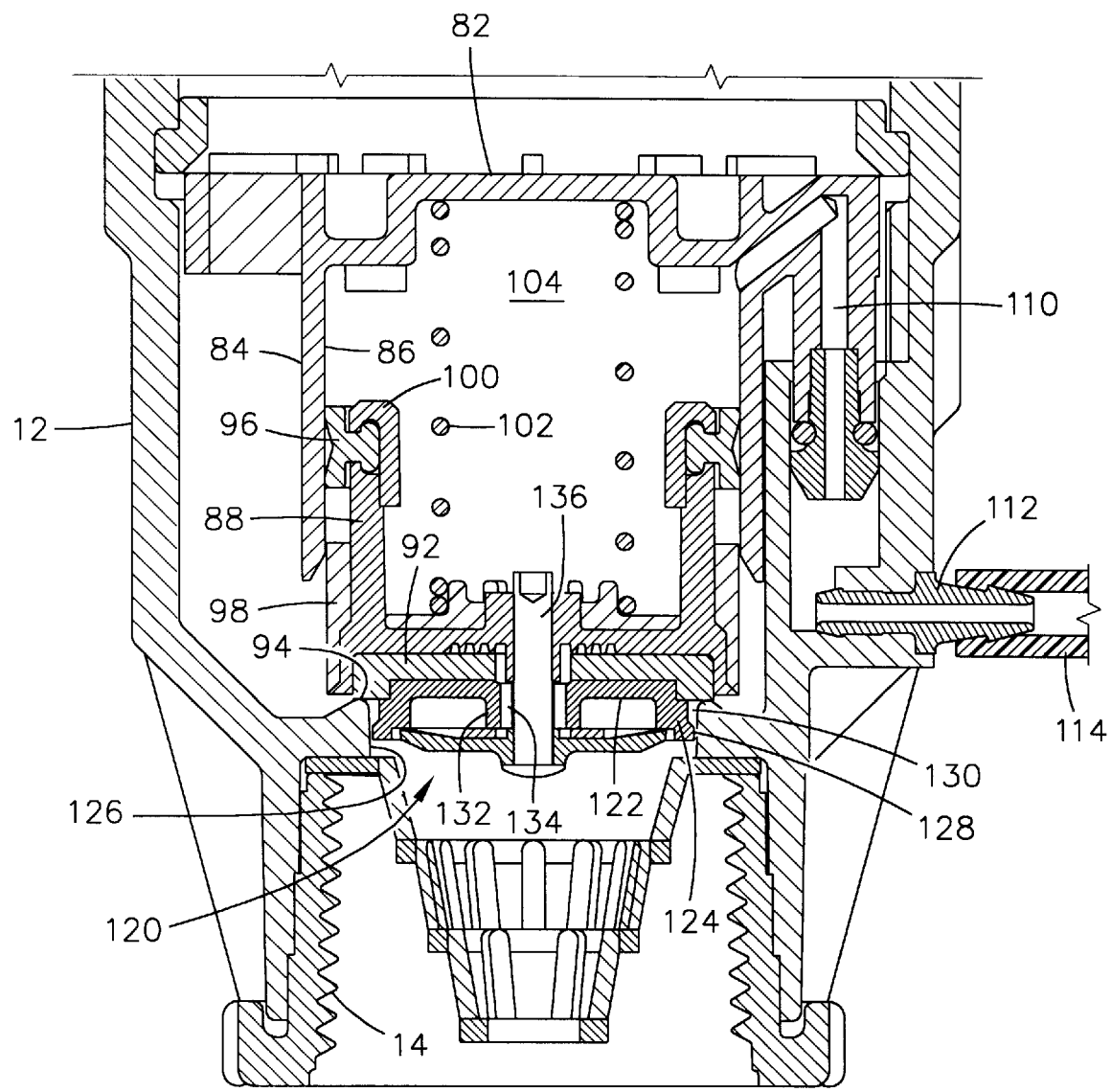
FIG. 3 is an enlarged vertical sectional view showing details of a preferred embodiment of the inlet flow check valve assembly of the present invention.

In accordance with the present invention, the sprinkler unit 10 has a modified inlet flow check valve assembly 120 (FIG. 3). A velocity control disc 122 is mounted in overlapping fashion concentric with the valve seal 92 of the valve member 88 and the strainer disc 108 and extends into the inlet passage. The velocity control disc 122 has a generally circular dish shape with an axially extending outer peripheral wall 124. The wall 124 has a stepped outer surface and extends past the valve seat 94 into a generally cylindrical inlet portion 126 of the valve body inlet co-axial with, and adjacent to, the valve seat 94. The outer peripheral wall 124 of the velocity control disc 122 is formed with a forwardmost portion 128 having the greater diameter and an intermediate portion 130 with a lesser diameter. The diameter of the forwardmost portion 128 is preferably slightly less than that of the cylindrical inlet passage by an amount that can vary from about one percent up to about ten percent. A central forward extending cylindrical wall 132 forms a central passage 134 around a pin or rivet 136 for pilot control fluid for the check valve assembly 120. An inlet screen 138 filters out large particles and debris from fluid arriving through the inlet opening 14.

Figure 4:
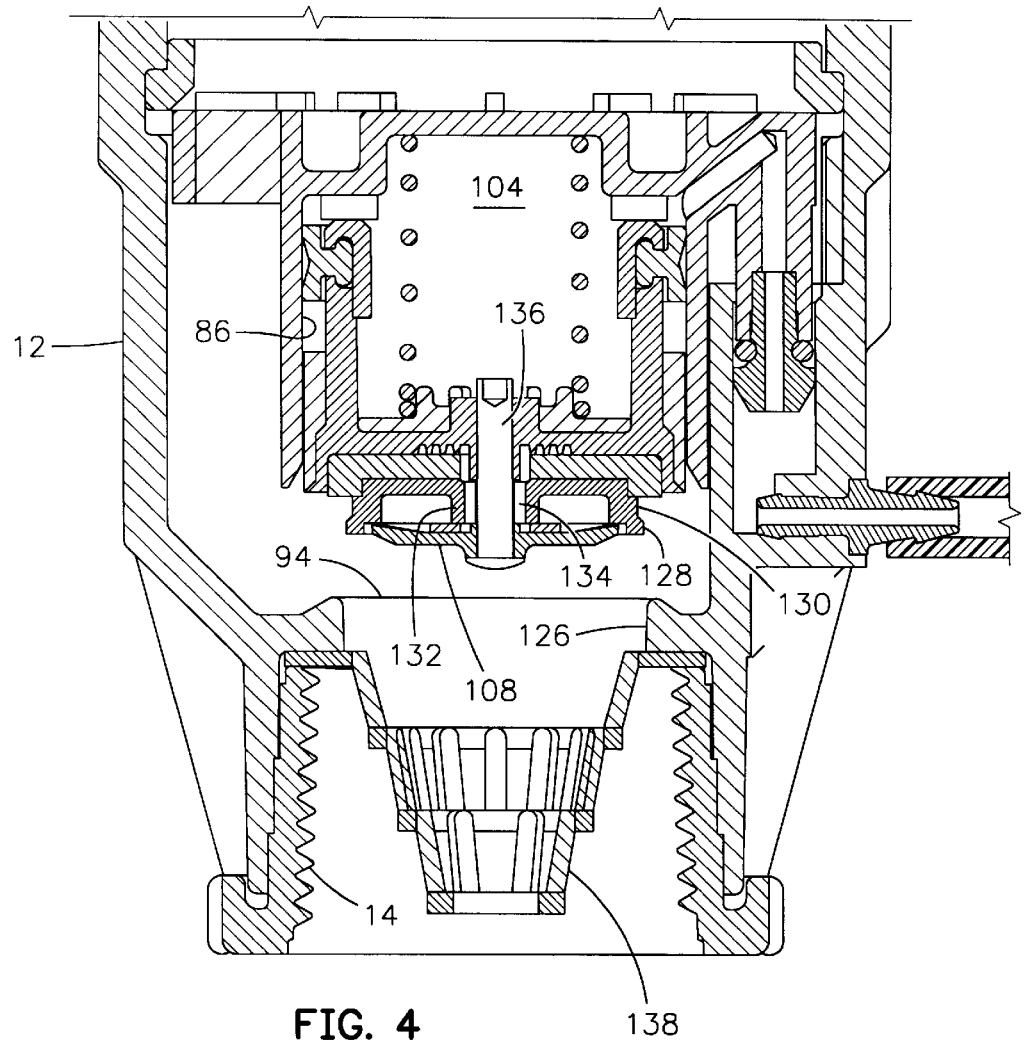
FIG. 4 is a view similar to FIG. 3 showing the inlet flow check valve assembly in its open position.

Referring to FIG. 4, the inlet flow check valve assembly 120 with the velocity control disc 122 is shown in its fully open position. The pressure drop through the valve was found in tests to be the same as that of the conventional inlet flow check valve assembly 80 (FIG. 1).

The velocity control disc 122 (FIG. 3) cooperates with the wall of the valve inlet passage to meter the incoming air and/or water during initial opening of the check valve assembly 120 resulting in a slower pop-up stroke of the riser 20 and a lower impact at the end of the stroke. The disc 122 also acts to strain large particles during closing as it moves into close proximity of the inlet passage wall and keeps them from being trapped between the valve seat seal and valve seat. The inlet flow check valve assembly 120 has been shown by tests to reduce the opening speed of the riser 20 by ninety-five percent. The velocity control disc 122 extends into the inlet passage and acts as a metering device resulting in damping the opening velocity of the valve member 88 and the velocity of the riser 20 on its pop-up stroke.

In operation, when a fluid such as air or water under pressure is supplied to the inlet of the sprinkler unit 10 and the chamber 104 (FIG. 3) is vented, inlet fluid acts against the face of valve member 88 to force it from its seat 94. Fluid initially begins flowing around the peripheral edge of the velocity control disc 122 and is metered resulting in a slower opening of the valve member 88 and a slower flow of fluid into the sprinkler unit. This results in a slower movement of the riser 20 to its extended position and lessens the resulting impact force on it. The velocity control disc 122 thus serves a metering or damping means.

When the check valve assembly 120 is being closed or shut down after a flow of water, the velocity control disc 122 extends into the inlet passage first and begins metering the water and forcing it at high velocity across the valve seat 94. This flushes debris from the seat to insure a more complete seal. The disc 122 also blocks the passage of larger particles which can lodge on the valve seat 94.

Figure 5:
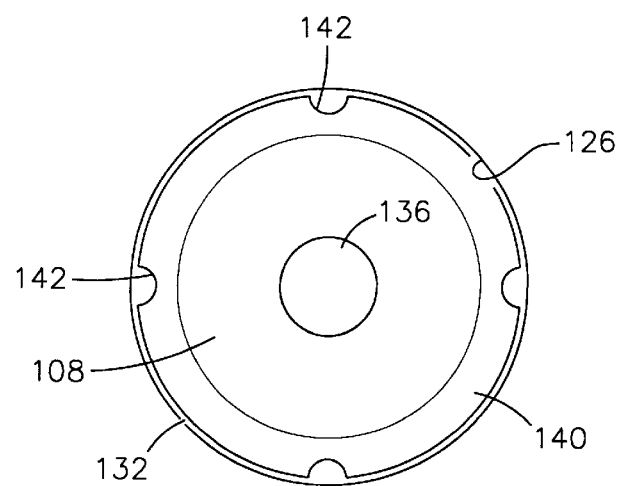
FIG. 5 is an end elevation view showing a velocity control disc in accordance with an alternate embodiment of the present invention.

Referring to FIG. 5, an alternate embodiment 140 of the velocity control disc is illustrated. The velocity control disc 140 is constructed substantially like the previous embodiment 122 with the addition of notches 142 around the peripheral edge. These notches may be selected in size, shape and/or number to achieve the desired result. While the illustrated notches are semi-circular, they may be V-shaped, square or any other suitable shape. The spacing of the stepped peripheral walls of the disc 140 will be closer than in the previous embodiment, and may be adjusted as will be apparent to those skilled in the art.

While I have illustrated and described my invention by means of specific embodiments, it should be understood that numerous changes and modifications may be made therein without departing from the spirit and scope of the invention as defined in the appended claims:

I claim:

1. A sprinkler unit, comprising:

a housing having an inlet including a passage for connecting to a source of fluid;

a riser mounted in said housing for moving from a normally retracted position to an operative extended position in response to fluid pressure;

a pressure responsive inlet valve assembly including a valve seat surrounding said inlet and a valve member having annular sealing means biased into engagement with said seat; and damping means mounted on said valve member and extending into said passage at said inlet, said damping means metering initial inlet fluid for controlling the rate of opening of said valve member for controlling flow of fluid through said inlet valve assembly and extension of said riser to said extended position.

2. A sprinkler unit according to claim 1 wherein said damping means comprises a disc mounted on said valve member and having an outer peripheral wall extending into said inlet passage.

3. A sprinkler unit according to claim 2 wherein said inlet passage has a cylindrical portion and said outer peripheral wall extends into said cylindrical portion and defines an annular metering passage.

4. A sprinkler unit according to claim 3 wherein said outer peripheral wall is radially stepped.

5. A sprinkler unit according to claim 4 wherein said disc is mounted between a strainer disc and a face of said valve member.

6. A sprinkler unit according to claim 5 wherein said disc includes cylindrical wall including means defining a metering passage.

7. A sprinkler unit according to claim 2 wherein said disc includes a central cylindrical wall including means defining a metering passage.

8. A sprinkler unit according to claim 7 wherein said disc is radially stepped.

9. A sprinkler unit according to claim 1 wherein said damping means comprises a disc mounted on said valve member and having an outer radially stepped peripheral rim extending into said inlet passage.

10. A sprinkler unit according to claim 9 wherein said outer radially stepped peripheral rim is defined by an axially extending outermost portion.

11. A sprinkler unit comprising:

a housing having an inlet passage for connecting to a source of fluid;

a riser mounted in said housing for moving from a normally retracted position to an operative extended position in response to fluid pressure;

an annular valve seat surrounding an inner end of said inlet passage;

a pressure responsive inlet valve member mounted for movement into and out of engagement with said valve seat;

a seal member carried by said valve member and sealingly engageable with said valve seat; and damping means mounted on said valve member and extending into said inner end of said inlet passage, said damping means metering initial inlet water for controlling the rate of opening of said valve for controlling flow of fluid through said valve and extension of said riser to said extended position.

12. A sprinkler unit according to claim 11 wherein said damping means comprises a disc mounted on said valve member and having an axially extending rim extending into said inlet passage.

13. A sprinkler unit according to claim 12 wherein said rim is radially stepped.

14. A sprinkler unit according to claim 13 wherein said disc includes a central cylindrical wall including means defining a metering passage.

15. A sprinkler unit according to claim 14 wherein said disc is mounted between a strainer disc and a face of said valve member.

16. A sprinkler unit according to claim 12 wherein said disc has a diameter that is less than that of the inlet.

17. A sprinkler unit according to claim 16 wherein said disc diameter is less than that of the inlet by about from one to about ten percent.

18. A sprinkler unit according to claim 16 wherein said axially extending rim includes at least one notch.

19. A pop-up rotary sprinkler unit comprising:

an elongated generally cylindrical housing having an inlet coaxially disposed at one end for connecting to a source of fluid, and an outlet including a nozzle at another end for distributing water outward from said housing, a passage correcting said inlet to said outlet;

a riser mounted in said housing between said inlet and said outlet for moving from a normally retracted position to an operative extended position in response to fluid pressure; and a flow control valve assembly in said passage at said inlet, said valve assembly comprising an annular valve seat surrounding said inlet, a first cylindrical bore coaxially of said valve seat, a valve member mounted for movement into and out of engagement with said valve seat, damping means including a stepped diameter disc mounted on said valve member and extending into said passage at said inlet, said damping means metering initial inlet water for controlling the rate of opening of said valve for controlling flow of fluid through said valve and extension of said riser to said extended position.

20. A sprinkler unit according to claim 19 wherein said disc has a diameter that is less than that of the inlet.

\* \* \* \* \*

UNITED STATES PATENT AND TRADEMARK OFFICE
CERTIFICATE OF CORRECTION

PATENT NO. : 5,927,607
DATED : July 27, 1999
INVENTOR(S) : Loren W. Scott

It is certified that error appears in the above-indentified patent and that said Letters Patent is hereby corrected as shown below:

```
On the title page, item [54] and col. 1, line 1,
change "SPRINKLE" to --SPRINKLER--.
```

Signed and Sealed this

Twenty-third Day of November, 1999

Attest:

Q. TODD DICKINSON

Attesting Officer

Acting Commissioner of Patents and Trademarks